Sept. 23, 1958　　　J. J. DE MARCO ET AL　　　2,853,618
METHOD AND APPARATUS FOR THE USE OF FLUORESCENT
X-RAYS IN POWDER DIFFRACTION
Filed Oct. 27, 1954　　　　　　　　　　　2 Sheets-Sheet 1

INVENTORS.
John J. DeMarco
Richard J. Weiss
George J. Weremchuk
BY W. E. Thibodeau + A. W. Dew
ATTORNEYS

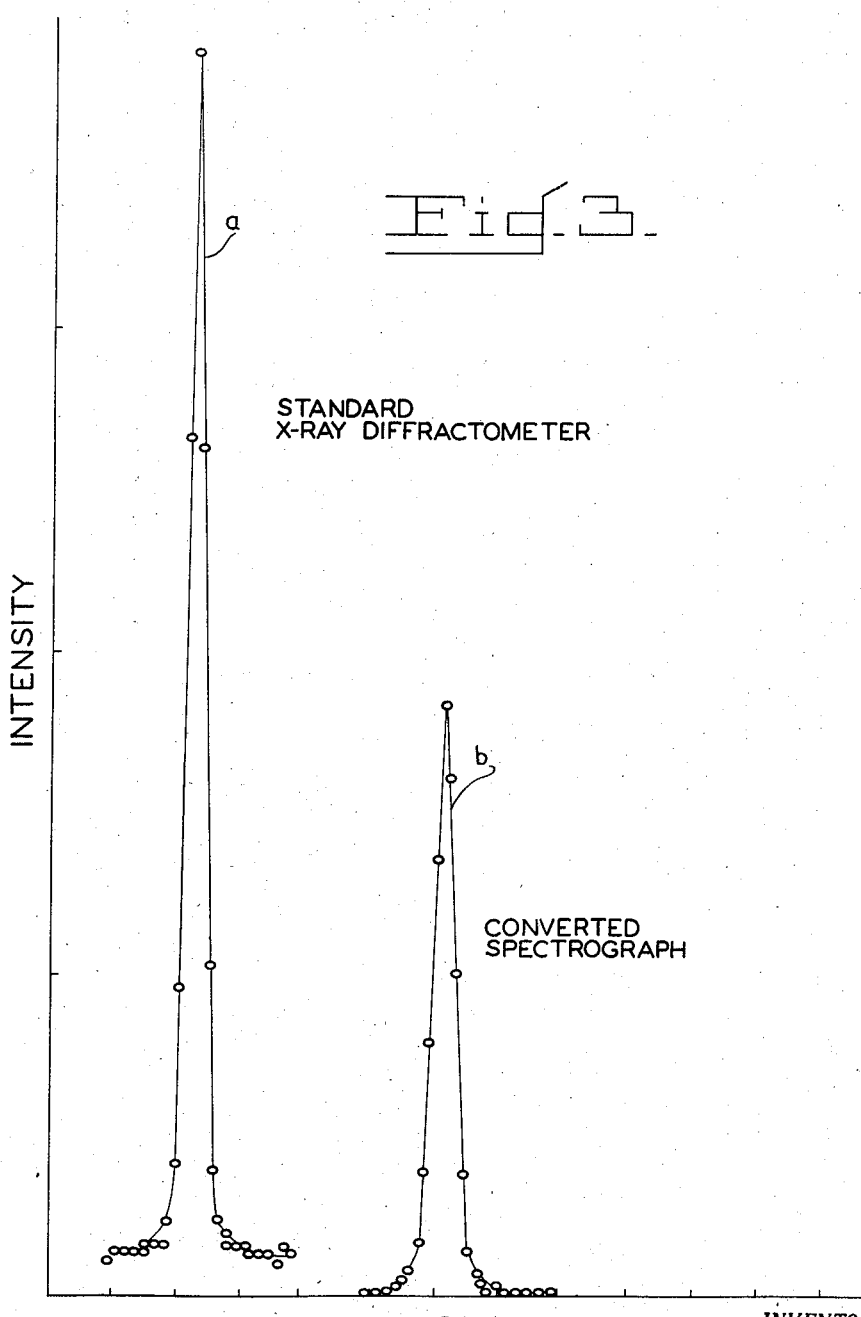

United States Patent Office 2,853,618
Patented Sept. 23, 1958

---

2,853,618

METHOD AND APPARATUS FOR THE USE OF FLUORESCENT X-RAYS IN POWDER DIFFRACTION

John J. De Marco, West Somerville, and Richard J. Weiss, Natick, Mass., and George John Weremchuk, Mastic, N. Y., assignors to the United States of America as represented by the Secretary of the Army Application October 27, 1954, Serial No. 465,157

4 Claims. (Cl. 250—53)

(Granted under Title 35, U. S. Code (1952), sec. 266)

The invention described herein may be manufactured and used by or for the Government for governmental purposes without the payment of any royalty thereon.

This invention relates to the analysis of crystalline material by X-ray diffraction and is more particularly directed to an improved method and apparatus for utilizing X-ray fluorescence to produce diffraction patterns directly from the test specimen to be analyzed.

When a specimen of crystalline material is irradiated by X-ray quanta, the excitation of the various chemical elements therein produces characteristic emission lines with intensities in direct proportion to the percentages of the corresponding elements. In X-ray spectrography, the primary radiation emitted by a high-intensity X-ray tube is directed against a stationary specimen and the resulting fluorescent radiation beam is passed through a collimator for impingement on a rotatable analyzing crystal having a known interplanar atomic spacing which acts as a diffraction grating and thereby separates the beam into its component wave-lengths for subsequent detection by a Geiger tube. The percentage of each element in the test specmen is thereafter obtained by comparing the measured intensity of the corresponding component wave-length with similar data obtained from a standard specimen of known elemental content.

While the foregoing procedure provides a rapid, non-destructive technique for correctly identifying the unknown chemical elements in a crystalline material and for determining the percentages thereof, the complete study of a given material also requires a precise determination of the various chemical compounds therein as well as a detailed knowledge of the physical structures of such compounds. This additional information is customarily obtained by utilizing the test specimen itself to diffract a primary monochromatic X-ray beam and then measuring the various angles of reflection produced during rotation of the specimen. Through these measurements and a knowledge of the wave-length of the incident X-ray beam, the interplanar atomic spacing of the irradiated specimen can be readily determined in accordance with Bragg's Law.

The foregoing requirement for a primary X-ray beam of known wave-length eliminates the possibility of using the polychromatic radiation obtained from the tungsten target type of high-intensity X-ray tube normally employed in spectrographic analysis. Instead, the target within the X-ray tube must be an element which will provide a monochromatic radiation whose wave-length is particularly suited to the characteristic absorption edge of the material of which the specimen is composed. However, since the chemical analysis of the specimen is the unknown factor to be determined, the correct selection of the proper X-ray tube requires an experimental substitution of a multiplicity of tubes each having a different target material. Inasmuch as each of these X-ray tubes is quite expensive, it is readily apparent that the prior art method of X-ray diffraction analysis constitutes an extremely costly procedure. In addition, the choice of wave-lengths is unduly restricted in view of the fact that the physical properties of some elements are such that volatilization thereof will occur under electron bombardment.

Accordingly, it is an object of this invention to provide an improved method and apparatus for producing a monochromatic beam of X-radiation of any desired wave-length in the X-ray spectrum for irradiating a test specimen to produce a characteristic X-ray diffraction pattern thereof.

It is a further object of this invention to utilize a high-intensity industrial type of X-ray tube as the source of X-radiation in the X-ray diffraction analysis of a test specimen.

Another object of this invention lies in the provision of an improved method and apparatus for X-ray diffraction analysis in which the background noise which invariably accompanies the characteristic peaks of the diffraction pattern is practically negligible.

A more specific object of this invention is to provide a simple means of converting an X-ray spectrograph for use as an X-ray diffractometer.

Still another object of the present invention is the provision of an improved focusing arrangement in an X-ray spectrograph modified for diffraction analysis.

A still further object of this invention is to provide an improved X-ray diffraction apparatus wherein the test specimen is irradiated with a monochromatic fluorescent radiation of predetermined wave-length.

According to the invention to be more fully explained hereinafter, a desired target material is placed in the position ordinarily occupied by the test specimen in an X-ray spectrograph and the conventional analyzing crystal is replaced with the specimen to be studied. When irradiated by the X-ray beam emitted from the high voltage industrial type X-ray tube normally utilized in X-ray spectrography, the target material emits a monochromatic radiation characteristic of the particular element of which the target is composed. This characteristic radiation is then guided to form a focal spot diverging in the plane perpendicular to the specimen axis and is directed against the specimen itself for reflection therefrom at the Bragg angle. The reflected beam is thereafter collimated by a system of Soller slits so as to limit the divergence thereof in the plane of the specimen axis to the same extent as the divergence imparted thereto prior to striking the test specimen. A receiving slit parallel to the axis of the specimen simultaneously limits the width of the divergent beam approximately to that of the projected focal spot. After passing through this receiving slit, the beam is detected preferably by a Geiger-Müller counter.

The specific nature of the invention as well as other objects and advantages thereof will clearly appear from a description of a preferred embodiment as shown in the accompanying drawings in which:

Fig. 3 is a graphic comparison of the 110 peak of iron powder made with a standard X-ray diffractometer using a cobalt tube and also made with the apparatus shown in Fig. 2 using pure cobalt as a target.

Figure 1:
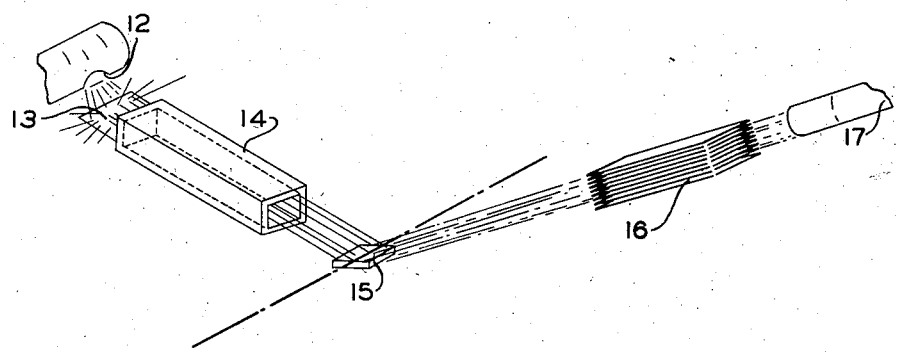
Fig. 1 is a schematic diagram of the apparatus comprising a conventional X-ray spectrograph for obtaining the X-ray spectrum of a test specimen.

Referring to the drawings, 12 represents the emission window in an industrial type of high voltage X-ray tube through which a beam of X-radiation is directed against a test specimen 13 to produce a characteristic fluorescent X-ray spectrum. The combined fluorescent radiations are passed through a collimator 14 in order to provide the necessary degree of parallelism and the resulting beam is directed against an analyzing crystal 15 of known interplanar spacing for separation into its component wave-lengths according to Bragg's Law. The parallelism of the diffracted beam of X-rays issuing from crystal 15 is maintained by a plurality of horizontal Soller slits 16 prior to impingement on a detector 17 such as a Geiger-Müller tube which measures the intensities of the various wave-lengths to provide information relative to the percentages of the chemical elements present in the test specimen.

Figure 2:
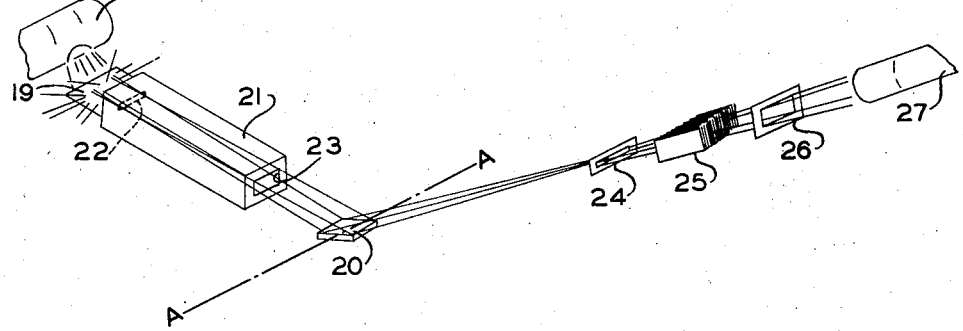
Fig. 2 is a similar schematic diagram of an X-ray spectrograph modified in accordance with the teachings of the present invention.

Ordinarily, the conversion of the aforesaid spectrograph to a diffractometer requires, among other things, the substitution of the high voltage tungsten target industrial type of X-ray tube by a special tube having a target element selected to emit the particular monochromatic radiation to which the absorption edge of the material in the test specimen to be analyzed will provide an optimum response. However, the present invention contemplates the retention of the conventional X-ray tube employed in the apparatus of Fig. 1 and which in Fig. 2 is hereinafter designated by the numeral 18. Since X-ray diffraction requires a source of monochromatic X-radiation, a target material 19 is placed in position preferably below and forwardly of X-ray tube 18 to receive the polychromatic X-radiation emitted from the anode of tube 18 as a point source. Target material 19 comprises a rectangular block composed entirely of a single pure element selected to provide monochromatic X-radiation of the desired wave-length. On the other hand, if the particular element is not available in the quantity necessary to form the entire block, such element can consist merely of a thin plating on any base metal of the required configuration. In the conventional X-ray diffractometer, the focal spot of the X-ray tube can be made a part of the collimating system. But since the present invention employs a separate target material 19 to obtain a fluorescent or secondary source of X-radiation for irradiating a test speciment 20, the scattering of the radiation from target material 19 precludes the existence of an actual focal spot. Accordingly, the parallel collimator 14 shown in Fig. 1 is converted to a divergence slit assembly 21 in order to form an apparent focal spot which can be properly diverged to irradiate the entire face of test specimen 20. This is accomplished by providing a slit 22 in the receiving end of assembly 21 substantially parallel to the axis of rotation of test specimen 20 such axis being designated by the letters A—A. Slit 22 is dimensioned in the plane parallel to axis A—A to be substantially equivalent to specimen 20 while the dimension of slit 22 in the plane perpendicular to axis A—A is selected to provide the desired resolution. A substantially rectangular opening 23 is formed in the exit end of assembly 21 dimensionally equivalent to slit 22 in the plane of axis A—A but with a sufficient increase in the plane perpendicular thereto to provide the necessary divergence of the beam of X-radiation.

After striking specimen 20, the X-radiation is reflected at the Bragg angle toward a receiving slit 24 disposed parallel to divergence slit 22 and located at the same distance beyond specimen 20 as the distance from specimen 20 to slit 22 in slit assembly 21. Upon passage through receiving slit 24, the subsequent divergence of the X-radiation is limited in the plane of axis A—A by means of a plurality of vertical Soller slits 25 in order to provide improved resolution. The X-radiation beam is thereafter passed through a scatter slit 26 which limits the divergence thereof in the plane perpendicular to axis A—A for effecting optimum resolution. A Geiger-Müller tube 27 is mounted for rotation together with specimen 20 and the collimating apparatus of slits 24, 25 and 26 and consequently serves to continuously detect the X-radiation reflected from specimen 20.

As can be clearly seen from the above described arrangement, the present invention provides any desired monochromatic radiation merely through the simple and rapid expedient of changing target material 19. It is well-known that when a target composed of a single pure chemical element is irradiated by a high-intensity X-radiation, the resulting fluorescent radiation emitted from the target consists mainly of the characteristic wave-length of the particular element employed. In a conventional diffractometer, the primary X-radiation produced by the electron bombardment of a target material composed of a single element not only provides the characteristic wave-length of such element but also produces a continuous spectrum on which the characteristic wave-length is superimposed. Thus, when a test specimen is irradiated with this primary X-radiation, the graph of the peaks produced by the characteristic wave-lengths of the material of which the specimen is composed also includes the undesirable readings produced by the continuous spectrum which are commonly referred to as "back-ground noise."

The difference between the reading obtained with a standard X-ray diffractometer and that produced by the converted spectrograph of the present invention is shown by curves "a" and "b," respectively, in the graph of Fig. 3. The test specimen for both readings consisted of iron powder whose X-ray spectrum provides a noticeable 110 peak. The standard X-ray diffractometer was used with an X-ray tube having a cobalt anode or target and produced curve "a." The converted spectrograph of the present invention employed a standard high-intensity tungsten tube to produce the primary X-ray beam for irradiating a target composed of pure cobalt. A 0.0006 inch iron filter was utilized between the X-radiation and the test specimen to filter out the $K_\beta$ in both "a" and "b." A comparison of both curves reveals that while the intensity of the curve "a" is twice as great as curve "b," the resolution of the former includes an appreciable amount of back-ground noise while that of the latter is practically negligible and therefore more than adequately compensates for the differences in the intensities of the two curves.

Furthermore, since the present invention utilizes industrial types of high voltage X-ray tubes which are readily available and are being constantly manufactured to provide higher and higher voltages, the intensities and resolution of the final diffraction readings are appreciably increased in comparison to those obtained with diffractometer apparatus utilizing special X-ray tubes with targets of material not as resistant to high temperatures as tungsten.

Although a particular embodiment of the invention has been described in detail herein, it is evident that many variations may be devised within the spirit and scope thereof and the following claims are intended to include such variations.

We claim:

1. X-ray diffraction apparatus for determining the chemical and crystal structure of a crystalline material, comprising means for generating a beam of polychromatic primary X-radiation diverging from a point source, an elemental target material disposed in the path of the beam of primary X-radiation and selected to convert the primary X-radiation to a broad source of monochromatic secondary fluorescent X-radiation having a characteristic wave length greater than the maximum absorption edge among the various elements of interest in the crystalline material under examination, means for reflecting the secondary X-radiation from a test specimen of the crystalline material during the rotation thereof about a given axis, and means for detecting the variations in intensity of the reflected beam of secondary X-radiation at various angles of reflection from the rotating test specimen.

2. X-ray diffraction apparatus for determining the chemical and crystal structure of a crystalline material, comprising an X-ray tube for generating a beam of polychromatic X-radiation diverging from a point source therein, an elemental target material disposed in the path of the primary X-radiation beam exteriorly of said tube, said target material being selected to convert the primary X-radiation to a broad source of monochromatic secondary fluorescent X-radiation having a characteristic wave length slightly greater than that represented by the maximum absorption edge among the various elements of interest in the crystalline material under examination, a first slit system for guiding the secondary X-radiation against a test specimen of the crystalline material during rotation thereof about a given axis, said first slit system including means for focusing the secondary X-radiation into a beam apparently originating from a first line source parallel to the axis of rotation of the test specimen and diverging in a plane perpendicular thereto, means for limiting the divergence of the secondary X-radiation beam to irradiate the maximum area of the test specimen, a second slit system for converging the X-radiation reflected from the test specimen into a beam apparently originating from a second line source parallel to said first line source and similarly disposed relative to the axis of rotation of the test specimen, said second slit system including means for separating the reflected beam of secondary X-radiation into a plurality of parallel beams diverging in a plane perpendicular to the axis of rotation of the test specimen, and a Geiger-Müller tube for detecting the intensities of the parallel beams of secondary X-radiation at the various angles of reflection from the test specimen.

3. In X-ray diffraction apparatus for analyzing a crystalline material in the form of a test specimen mounted for rotation about a given axis thereof, the combination of an X-ray tube having a tungsten anode for generating a polychromatic beam of primary X-radiation diverging from a point source, an elemental target material disposed exteriorly of said tube in the path of the primary X-radiation beam and selected to convert the primary X-radiation to a broad source of monochromatic secondary fluorescent X-radiation having a characteristic wave length slightly longer than the wave length represented by the maximum absorption edge of the chemical elements included in the test specimen, a first slit system for impinging the secondary X-radiation against the maximum area of the rotating test specimen, a second slit system for converging the X-radiation reflected from the test specimen into a beam apparently originating from a line source parallel to the axis of rotation of the test specimen and diverging in a plane perpendicular thereto, a plurality of vertical Soller slits for collimating the diverging beam of reflected secondary X-radiation into a plurality of parallel beams, a scatter slit for limiting the divergence of the parallel beams to effect optimum resolution, and a Geiger-Müller tube mounted for rotation with the test specimen for detecting the intensities of the parallel beams of secondary X-radiation at the various angles of reflection from the test specimen.

4. The combination defined in claim 3 wherein said first slit system comprises a rectangular member having a slit in the end adjacent said elemental target material and a rectangular opening in the opposite end thereof, said slit and said opening being parallel and having equal transverse dimensions equivalent to that of the test specimen along the axis of rotation thereof and parallel thereto, said rectangular opening being dimensioned in the plane perpendicular to the axis of rotation of the test specimen to diverge said beam of secondary X-radiation for irradiating the maximum area presented thereto by the rotating test specimen.

References Cited in the file of this patent

UNITED STATES PATENTS

| | | |
|---|---|---|
| 1,920,601 | Slack | Aug. 1, 1933 |
| 2,521,772 | Beeghly | Sept. 12, 1950 |
| 2,549,987 | Parrish et al. | Apr. 24, 1951 |

OTHER REFERENCES

Reiffel: Beta-Ray-Excited Low-Energy X-Ray Sources, Nucleonics, vol. 13, No. 3, March 1955, pp. 22 to 24.